(12) United States Patent
Yan et al.

(10) Patent No.: US 10,778,570 B2
(45) Date of Patent: Sep. 15, 2020

(54) NETWORK PROTECTION METHOD, NETWORK NODE AND SYSTEM

(71) Applicant: Huawei Technologies Co., Ltd., Shenzhen (CN)

(72) Inventors: Jun Yan, Wuhan (CN); Zhiquan Liao, Shenzhen (CN); Tianhai Chang, Shenzhen (CN); Hongtao Lu, Shenzhen (CN); Min Chen, Chengdu (CN); Qian Xiong, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 15/834,683

(22) Filed: Dec. 7, 2017

(65) Prior Publication Data

US 2018/0109445 A1    Apr. 19, 2018

Related U.S. Application Data

(63) Continuation of application No. PCT/CN2016/084755, filed on Jun. 3, 2016.

(30) Foreign Application Priority Data

Jun. 8, 2015    (CN) .......................... 2015 1 0310589

(51) Int. Cl.
*H04L 12/703* (2013.01)
*H04L 12/24* (2006.01)
(Continued)

(52) U.S. Cl.
CPC .............. *H04L 45/28* (2013.01); *H04L 41/00* (2013.01); *H04L 41/0663* (2013.01);
(Continued)

(58) Field of Classification Search
CPC .... H04L 45/28; H04L 41/0663; H04W 76/18; H04W 24/04; H04W 76/19
See application file for complete search history.

(56) References Cited

U.S. PATENT DOCUMENTS 7,269,347 B1    9/2007  Matricardi et al.
2002/0097462 A1 7/2002  Koyano et al.
(Continued)

FOREIGN PATENT DOCUMENTS

CN    1728645 A    2/2006
CN    101141349 A  3/2008
(Continued)

OTHER PUBLICATIONS

Machine Translation and Abstract of Chinese Publication No. CN1728645, Feb. 1, 2006, 14 pages.
(Continued)

*Primary Examiner* — Min Jung
(74) *Attorney, Agent, or Firm* — Conley Rose, P.C.

(57) ABSTRACT

In a network protection method, a network node, and a communications system provided in embodiments of the present disclosure, when signal degrade or signal fail occurs in a service transmission path, a communication status of a source node of a current protection segment is obtained, and whether to perform protection switching is determined according to the communication status of the source node and a communication status of a local communication path. This can avoid erroneous switching to some extent, thereby improving protection switching accuracy of a communications network.

20 Claims, 5 Drawing Sheets

(51) Int. Cl.
*H04W 76/19* (2018.01)
*H04W 76/18* (2018.01)
*H04W 24/04* (2009.01)

(52) U.S. Cl.
CPC .......... *H04W 24/04* (2013.01); *H04W 76/18* (2018.02); *H04W 76/19* (2018.02)

(56) References Cited

U.S. PATENT DOCUMENTS

| | | |
|---|---|---|
| 2003/0120983 A1 | 6/2003 | Vieregge et al. |
| 2007/0292129 A1* | 12/2007 | Yan ................ H04B 10/032 398/5 |
| 2009/0067835 A1 | 3/2009 | Chen |
| 2009/0185482 A1* | 7/2009 | Yang ............... H04L 41/0677 370/218 |
| 2011/0075550 A1* | 3/2011 | Sultan ............. H04L 12/4625 370/217 |
| 2012/0051736 A1 | 3/2012 | Yan et al. |
| 2012/0163795 A1* | 6/2012 | Gu .................... H04J 3/14 398/1 |
| 2013/0235718 A1* | 9/2013 | Wu ................. H04L 41/0663 370/225 |
| 2014/0258772 A1* | 9/2014 | Kataria ............... H04B 3/50 714/4.11 |
| 2015/0131433 A1* | 5/2015 | Fu ..................... H04L 45/28 370/228 |
| 2015/0229398 A1* | 8/2015 | Lee ................... H04B 10/27 398/66 |
| 2016/0149752 A1* | 5/2016 | Belanger ............ H04L 43/08 370/216 |
| 2016/0164596 A1* | 6/2016 | Rao ................. H04B 10/032 398/5 |

FOREIGN PATENT DOCUMENTS

| | | |
|---|---|---|
| CN | 101374070 A | 2/2009 |
| CN | 101588520 A | 11/2009 |
| CN | 101883295 A | 11/2010 |
| CN | 103141036 A | 6/2013 |
| CN | 103313148 A | 9/2013 |
| CN | 104158586 A | 11/2014 |
| EP | 2827506 A1 | 1/2015 |
| EP | 2879309 B1 | 5/2018 |

OTHER PUBLICATIONS

Machine Translation and Abstract of Chinese Publication No. CN101141349, Mar. 12, 2008, 10 pages.
Machine Translation and Abstract of Chinese Publication No. CN104158586, Nov. 19, 2014, 58 pages.
Foreign Communication From a Counterpart Application, Chinese Application No. 201510310589.X, Chinese Office Action dated Dec. 26, 2018, 6 pages.
Foreign Communication From a Counterpart Application, Chinese Application No. 201510310589.X, Chinese Office Action dated Dec. 12, 2018, 3 pages.
Foreign Communication From a Counterpart Application, European Application No. 16806779.1, Partial Supplementary European Search Report dated Mar. 7, 2018, 11 pages.
Machine Translation and Abstract of Chinese Publication No. CN101374070, Feb. 25, 2009, 26 pages.
Machine Translation and Abstract of Chinese Publication No. CN101588520, Nov. 25, 2009, 11 pages.
Foreign Communication From a Counterpart Application, PCT Application No. PCT/CN2016/084755, English Translation of International Search Report dated Aug. 29, 2016, 3 pages.

* cited by examiner

| 1 | 2 | 3 | 4 | 5 | 6 | 7 | 8 | 9 | 10 | 11 | 12 | 13 | 14 |
|---|---|---|---|---|---|---|---|---|----|----|----|----|----|
| FAS | | | | | | MFAS | SM | | | GCC0 | | | |
| ODU RES.A | ODU RES.E | TCM ACT | TCM6 | | | TCM5 | | | | TCM4 | | | FTFL |
| TCM3 | | TCM2 | | | TCM1 | | | | PM | | | EXP | |
| GCC1 | | GCC2 | | APS/PCC | | | | | | | | | |

Table 1

FIG. 10

NETWORK PROTECTION METHOD, NETWORK NODE AND SYSTEM

CROSS-REFERENCE TO RELATED APPLICATIONS

This application is a continuation of International Application No. PCT/CN2016/084755, filed on Jun. 3, 2016, which claims priority to Chinese Patent Application No. 201510310589.X, filed on Jun. 8, 2015. The disclosures of the aforementioned applications are hereby incorporated by reference in their entireties.

TECHNICAL FIELD

The present disclosure relates to the field of communications technologies, and in particular, to a network protection method, a network node, and a communications system.

BACKGROUND

Robustness of a communications network is a network characteristic to which a communications operator pays much attention. To enhance the robustness of the communications network, the communications operator usually establishes a standby path or a standby network for a communication path or a communications network during networking, and the standby path or the standby network is used to protect a service transmitted on the communication path or the communications network when a fault occurs in the communication path or the communications network.

As communications technologies change quickly, communications networks become more diversified and complex. Meanwhile, network protection technologies are also confronted with many new challenges.

As shown in FIG. 1, FIG. 1 exemplarily provides a communications network. In FIG. 1, a node A, a node B, and a node C are sequentially connected, where the node A and the node B are connected to each other using a working path (working path, indicated using W1 in the figure) and a protection path (protection path, indicated using P1 in the figure), and the node B and the node C are connected to each other using a working path (working path, indicated using W2 in the figure) and a protection path (protection path, indicated using P2 in the figure). Normally, a service sent by the node A to the node B is transmitted using the working path W1, and when a fault occurs in the working path W1, the node B starts protection switching, to switch the service from the working path W1 to the protection path P1, implementing service protection. Communication between the node B and the node C is normal and protection switching does not need to be performed.

However, during actual network operation, when the node B performs protection switching, the node B cannot normally send a signal to the node C in a particular period of time because of a known or an unknown reason such as clock switching or path switching. Additionally, due to a length difference between primary and secondary optic fibers and other reasons, it is possible that the node C erroneously determine that a fault occurs in W2, and then performs protection switching between W2 and P2. It can be learned that, in the prior art, protection switching between nodes may be erroneous switching sometimes, and accuracy of the protection switching is relatively low.

SUMMARY

In view of this, embodiments of the present disclosure provide a network protection method, an apparatus and a system.

According to a first aspect, an embodiment of the present disclosure provides a network protection method, where the method is applied to a communications network, the communications network includes a first protection segment, and the first protection segment includes a source node, a sink node, a first communication path, and a second communication path, where the source node and the sink node are connected using the first communication path and the second communication path, the first communication path is a current service transmission communication path between the source node and the sink node, and the second communication path is a standby path of the first communication path, where the method includes monitoring, by the sink node, the first communication path; if it is detected that a communication status of the first communication path is signal degrade or signal fail, obtaining, by the sink node, a communication status of the source node; and determining, by the sink node according to the communication status of the first communication path and the obtained communication status of the source node, whether the sink node switches a service to the second communication path.

With reference to the first aspect, in a first possible implementation manner, the determining, by the sink node according to the communication status of the first communication path and the obtained communication status of the source node, whether the sink node switches a service to the second communication path includes, if the communication status of the first communication path is not inferior to the communication status of the source node, skipping, by the sink node, performing switching, where that the communication status of the first communication path is not inferior to the communication status of the source node refers to that the communication status of the first communication path is signal degrade, and the communication status of the source node is signal degrade or signal fail; or that the communication status of the first communication path is not inferior to the communication status of the source node refers to that both the communication status of the first communication path and the communication status of the source node are signal fail.

With reference to the first aspect and the first implementation manner the first aspect, in a second possible implementation manner, the determining, by the sink node according to the communication status of the first communication path and the obtained communication status of the source node, whether the sink node switches a service to the second communication path includes, if the communication status of the first communication path is inferior to the communication status of the source node, switching, by the sink node, the service to the second communication path.

With reference to the first aspect and the first implementation manner the first aspect, in a third possible implementation manner, the first communication path includes one or more protection nodes, where the protection node is configured to provide standby protection for a partial path of the first communication path; the method further includes obtaining, by the sink node, communication statuses indicated by the one or more protection nodes; and the determining, by the sink node according to the communication status of the first communication path and the obtained communication status of the source node, whether the sink node switches a service to the second communication path includes, if the communication status of the first communication path is inferior to the communication status of the source node, and a communication status indicated by at least one of the one or more protection nodes is signal protected, skipping, by the sink node, performing switching, where the signal protected refers to that, a communication status of a standby path corresponding to a protection node is superior to a communication status of a current service transmission path corresponding to the same protection node; or the determining, by the sink node according to the communication status of the first communication path and the obtained communication status of the source node, whether the sink node switches a service to the second communication path includes, if the communication status of the first communication path is inferior to the communication status of the source node, a communication status indicated by at least one of the one or more protection nodes is signal protected, and a communication status indicated by a source node of a protection segment at which the at least one protection node is located is superior to the communication status of the at least one protection node, skipping, by the sink node, performing switching, where the signal protected refers to that, a communication status of a standby path corresponding to a protection node is superior to a communication status of a current service transmission path corresponding to the same protection node.

With reference to all the foregoing implementation manners, in a fourth possible implementation manner, the determining, by the sink node according to the communication status of the first communication path and the obtained communication status of the source node, whether the sink node switches a service to the second communication path includes, if that the communication status of the first communication path is inferior to the communication status of the source node is signal normal, all the communication statuses indicated by the one or more protection nodes are signal unprotected or the communication statuses indicated by the one or more protection nodes are signal protected, and a communication status indicated by a source node of a protection segment at which the at least one protection node is located is inferior to the communication status of the at least one protection node, switching, by the sink node, the service to the second communication path, where the signal unprotected refers to that, a communication status of a standby path corresponding to a protection node is not superior to a communication status of a current service transmission path corresponding to the same protection node.

With reference to all the foregoing implementation manners, in a fifth possible implementation manner, the communication status of the source node is represented using a value of a first series of bits carried at fixed locations in a signal, where the first series of bits include two or more (such as four) bits; and when the value of the first series of bits is 0000, it represents that a communication status of a signal sent by the source node to the sink node is signal normal, when the value of the first series of bits is 0001, it represents that a communication status of a signal sent by the source node to the sink node is signal degrade, or when the value of the first series of bits is 0010, it represents that a communication status of a signal sent by the source node to the sink node is signal fail. Alternatively, when the value of the first series of bits is 00, it represents that a communication status of a signal sent by the source node to the sink node is signal normal, when the value of the first series of bits is 01, it represents that a communication status of a signal sent by the source node to the sink node is signal degrade, or when the value of the first series of bits is 10, it represents that a communication status of a signal sent by the source node to the sink node is signal fail. Another protection node in the network may also insert, in a corresponding signal, a corresponding value used to represent a communication status. This is not limited in the present disclosure.

With reference to all the foregoing implementation manners, in a sixth possible implementation manner, a communication status of a node in the communications network is represented using a value of a second series of bits carried at fixed locations in a signal, where the second series of bits include three or more (such as four) bits; and when the value of the second series of bits is 0000, it represents that a communication status of a signal received by the corresponding node from the source node is signal normal, when the value of the second series of bits is 0001, it represents that a communication status of a signal received by the corresponding node from the source node is signal degrade and signal unprotected, when the value of the second series of bits is 0010, it represents that a communication status of a signal received by the corresponding node from the source node is signal fail and signal unprotected, when the value of the second series of bits is 0011, it represents that a communication status of a signal received by the corresponding node from the source node is signal degrade and signal protected, or when the value of the second series of bits is 0100, it represents that a communication status of a signal received by the corresponding node from the source node is signal fail and signal protected. Alternatively, when the value of the second series of bits is 000, it represents that a communication status of a signal received by the corresponding node from the source node is signal normal, when the value of the second series of bits is 001, it represents that a communication status of a signal received by the corresponding node from the source node is signal degrade and signal unprotected, when the value of the second series of bits is 010, it represents that a communication status of a signal received by the corresponding node from the source node is signal fail and signal unprotected, when the value of the second series of bits is 011, it represents that a communication status of a signal received by the corresponding node from the source node is signal degrade and signal protected, or when the value of the second series of bits is 100, it represents that a communication status of a signal received by the corresponding node from the source node is signal fail and signal protected.

With reference to all the foregoing implementation manners, in a seventh possible implementation manner, a node in the communications network determines an insert value of the second series of bits according to the following table:

| Communication status of current service transmission path | Communication status of standby path | Insert value |
| --- | --- | --- |
| signal fail | signal fail | 0010 |
| signal fail | signal degrade | 0100 |
| signal fail | signal normal | 0100 |
| signal degrade | signal fail | 0001 |
| signal degrade | signal degrade | 0001 |
| signal degrade | signal normal | 0011 |
| signal normal | signal fail | 0000 |
| signal normal | signal degrade | 0000 |
| signal normal | signal normal | 0000 | where the first column in the table is used to represent a communication status of a current service transmission path detected by the node, the second column in the table is used to represent a communication status of a standby path detected by the node, and the third column in the table is used to represent an insert value corresponding to the communication status of the current service transmission path and the communication status of the standby path.

With reference to all the foregoing implementation manners, in an eighth possible implementation manner, the communications network is an optical transport network (OTN); a communication status of a node in the OTN is carried in overheads of an OTN multiframe; and the OTN multiframe includes multiple OTN frames, and overheads of each OTN frame include a multiframe number, where one protection segment corresponds to one multiframe number, and different protection segments correspond to different multiframe numbers.

With reference to all the foregoing implementation manners, in a ninth possible implementation manner, a communication status of a node in the OTN is carried in the fourth row and one or more of the ninth column to the fourteenth column of an OTN frame.

With reference to all the foregoing implementation manners, in a tenth possible implementation manner, the overheads of the OTN multiframe further carry verification information; and the method includes obtaining, by the sink node, the verification information and verifying a communication status from the source node using the verification information, where the channel status of the source node is a channel status obtained after the verification is successful.

With reference to all the foregoing implementation manners, in an eleventh possible implementation manner, this method further includes monitoring, by the sink node, the second communication path, and inserting, at a predetermined location in an OTN frame corresponding to the first protection segment according to the communication status of the first communication path and a communication status of the second communication path, a corresponding value used to represent a communication status.

According to a second aspect, an embodiment of the present disclosure provides a network node, where the network node includes a receiver configured to receive a signal; and a protection switching controller configured to monitor, according to an input of the receiver, a communication path connected to the receiver; if a monitoring result indicates that a communication status of the communication path is a signal degrade state or a signal fail state, obtain a communication status of a source node of a protection segment at which the network node is located; and determine, according to the communication status of the communication path and the communication status of the source node, whether to switch a service to a standby path of the communication path, where the communication path is a current service transmission communication path between the source node and the network node.

With reference to the second aspect, in a first possible implementation manner, the determining, according to the communication status of the communication path and the communication status of the source node, whether to switch a service to a standby path of the communication path includes, if the communication status of the communication path is not inferior to the communication status of the source node, skipping performing switching, where that the communication status of the communication path is not inferior to the communication status of the source node refers to that the communication status of the communication path is signal degrade, and the communication status of the source node is signal degrade or signal fail; or that the communication status of the communication path is not inferior to the communication status of the source node refers to that both the communication status of the communication path and the communication status of the source node are signal fail.

With reference to the second aspect, in a second possible implementation manner, the determining, according to the communication status of the communication path and the communication status of the source node, whether to switch a service to a standby path of the communication path includes, if the communication status of the communication path is inferior to the communication status of the source node, switching the service to the standby path of the communication path.

With reference to the second aspect, in a third possible implementation manner, the protection switching controller is further configured to obtain communication statuses indicated by one or more protection nodes, where the one or more protection nodes are configured to provide standby protection for a partial path of the communication path; and the determining, according to the communication status of the communication path and the communication status of the source node, whether to switch a service to a standby path of the communication path includes, if the communication status of the communication path is inferior to the communication status of the source node, and a communication status indicated by at least one of the one or more protection nodes is signal protected, skipping performing switching, where the signal protected refers to that, a communication status of a standby path corresponding to a protection node is superior to a communication status of a current service transmission path corresponding to the same protection node; or the determining, according to the communication status of the communication path and the communication status of the source node, whether to switch a service to a standby path of the communication path includes, if the communication status of the communication path is inferior to the communication status of the source node, a communication status indicated by at least one of the one or more protection nodes is signal protected, and a communication status indicated by a source node of a protection segment at which the at least one protection node is located is superior to the communication status of the at least one protection node, skipping performing switching, where the signal protected refers to that, a communication status of a standby path corresponding to a protection node is superior to a communication status of a current service transmission path corresponding to the same protection node.

With reference to all the foregoing implementation manners of the second aspect, in a fourth possible implementation manner, the determining, according to the communication status of the communication path and the communication status of the source node, whether to switch a service to a standby path of the communication path includes, if the communication status of the communication path is inferior to the communication status of the source node, and all the communication statuses indicated by the one or more protection nodes are signal unprotected, switching the service to the standby path of the communication path, where the signal unprotected refers to that, a communication status of a standby path corresponding to a protection node is not superior to a communication status of a current service transmission path corresponding to the same protection node.

With reference to all the foregoing implementation manners of the second aspect, in a fifth possible implementation manner, the network node is applied to an OTN; a communication status of a node in the OTN is carried in overheads of an OTN multiframe; and the OTN multiframe includes multiple OTN frames, and overheads of each OTN frame include a multiframe number, where one protection segment corresponds to one multiframe number, and different protection segments correspond to different multiframe numbers.

With reference to all the foregoing implementation manners of the second aspect, in a sixth possible implementation manner, a communication status of a node in the OTN is carried in the fourth row and one or more of the ninth column to the fourteenth column of an OTN frame.

With reference to all the foregoing implementation manners of the second aspect, in a seventh possible implementation manner, the overheads of the OTN multiframe further carry verification information; and the protection switching controller is further configured to obtain the verification information and verify a communication status from the source node using the verification information, where the channel status of the source node is a channel status obtained after the verification is successful.

With reference to all the foregoing implementation manners of the second aspect, in an eighth possible implementation manner, the protection switching controller is further configured to monitor the second communication path, and insert, at a predetermined location in an OTN frame including a multiframe number corresponding to the first protection segment and according to the communication status of the first communication path and a communication status of the second communication path, a corresponding value used to represent a communication status.

With reference to all the foregoing implementation manners of the second aspect, in a ninth possible implementation manner, the receiver includes an optical-to-electrical conversion component configured to perform optical-to-electrical conversion on the received signal, and transmit an electrical signal obtained after the optical-to-electrical conversion to the protection switching controller; and the network node further includes a protection switching component configured to perform protection switching according to control of the protection switching controller.

A third aspect provides a communications system, where the communications system includes a network node provided in the second aspect.

A fourth aspect provides a computer readable medium configured to store an instruction, where when being run by a computer, the instruction drives the computer to perform any method described in the first aspect.

A fifth aspect provides an OTN frame, where the OTN frame is applied to a communications network, and used to transfer a communication status of a protection segment in the communications network, and the OTN frame includes an overhead area of four rows and fourteen columns, where the overhead area includes a multiframe number; and the overhead area further includes multiple bits used to carry the communication status of the protection segment, where the multiframe number corresponds to the protection segment.

With reference to the fifth aspect, in a first implementation manner, the multiframe number refers to last N bits of a multiframe alignment signal (MFAS) in the OTN frame, where N is greater than 1 and less than 8; and the multiple bits are located at the fourth row and one or more of the ninth column to the fourteenth column of the overhead area.

With reference to the fifth aspect, in a second implementation manner, a communication status of a source node of the protection segment is represented using a value of a first series of bits carried at fixed locations in the OTN frame, where the first series of bits are four bits; and when the value of the first series of bits is 0000, it represents that a communication status of a signal sent by the source node is signal normal, when the value of the first series of bits is 0001, it represents that a communication status of a signal sent by the source node is signal degrade, or when the value of the first series of bits is 0010, it represents that a communication status of a signal sent by the source node is signal fail. Another protection node in the network may also insert, in a corresponding signal, a corresponding value used to represent a communication status. This is not limited in the present disclosure.

With reference to the fifth aspect, in a third implementation manner, the communication status of the protection segment in the communications network is represented using a value of a second series of bits carried at fixed locations in the OTN frame, where the second series of bits are four bits; and when the value of the second series of bits is 0000, it represents that a communication status of a signal received by a corresponding node from the source node is signal normal, when the value of the second series of bits is 0001, it represents that a communication status of a signal received by a corresponding node from the source node is signal degrade and signal unprotected, when the value of the second series of bits is 0010, it represents that a communication status of a signal received by a corresponding node from the source node is signal fail and signal unprotected, when the value of the second series of bits is 0011, it represents that a communication status of a signal received by a corresponding node from the source node is signal degrade and signal protected, or when the value of the second series of bits is 0100, it represents that a communication status of a signal received by a corresponding node from the source node is signal fail and signal protected.

A sixth aspect provides an OTN multiframe, where the OTN multiframe is applied to a communications network, and used to transfer communication statuses of multiple protection segments in the communications network, the OTN multiframe includes multiple OTN frames, and each OTN frame includes an overhead area of four rows and fourteen columns, where a fixed location of each OTN frame includes a multiframe number, multiframe numbers of OTN frames in an OTN multiframe are different from each other, and multiframe numbers are cyclically used using a multiframe as a unit; each of the multiple protection segments corresponds to a multiframe number, and different protection segments correspond to different multiframe numbers; and a fixed location in an OTN frame that includes a corresponding multiframe number is used to carry a communication status of a protection segment that corresponds to the multiframe number included by the OTN frame.

In the network protection method, the network node, and the communications system provided in the embodiments of the present disclosure, when signal degrade or signal fail occurs in a service transmission path, a communication status of a source node of a current protection segment is obtained, and whether to perform protection switching is determined according to the communication status of the source node of the current protection segment and a communication status of a local communication path. This may avoid erroneous switching to some extent, thereby improving protection switching accuracy of a communications network.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show some embodiments of the present disclosure, and a person of ordinary skill in the art may still derive other drawings from these accompanying drawings without creative efforts.

FIG. 10 is a schematic structural diagram of an overhead area of an OTN frame according to an embodiment of the present disclosure.

DESCRIPTION OF EMBODIMENTS

Figure 1:
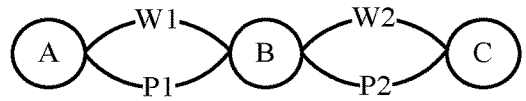
FIG. 1 is an architectural diagram of a network in the prior art.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

A method, an apparatus and a system provided in the embodiments of the present disclosure are all based on a same principle and design, and any non-conflicting or parallel aspects described in the embodiments of the present disclosure may be combined with each other. This is not limited in the embodiments of the present disclosure. For example, an aspect A is described in a part, an aspect B is described in another part, and as long as the aspect A and the aspect B do not conflict, or are not two parallel solutions, the aspect A and the aspect B may be combined by default. For example, the apparatus described in the embodiments of the present disclosure may have all functions mentioned in the method described in the embodiments of the present disclosure, so as to implement a corresponding method. Likewise, the method described in the embodiments of the present disclosure may be implemented using the apparatus of the embodiments of the present disclosure. Frame structures described in the embodiments of the present disclosure are universal for both the method and the apparatus, and may be combined with each other.

A protection segment mentioned in the embodiments of the present disclosure refers to a link between two nodes for which redundancy protection is configured. In different scenarios, a protection segment may be construed as including nodes at two ends of the protection segment. Different protection segments may be in a chain connection relationship with each other, or one or more protection segments may be nested in a protection segment. The redundancy protection may be in a 1+1 manner, may be in a 1:1 manner, may be in a 1:N manner, may be in an M:N manner, or may be in a ring network protection manner.

In the embodiments of the present disclosure, an upstream entity of an entity refers to an entity that is located upstream of the entity in a service transmission direction, and a downstream entity of an entity refers to an entity that is located downstream of the entity in the service transmission direction. The entity described herein may be a network node, may be a communication path, may be a protection segment, or may be a communications network. It should be noted that, in the case of a bidirectional transmission communications network, for example, in a transmission direction A→B→C, a node A and a node B are located upstream of a node C, and in a transmission direction C→B→A, the node B and the node C are located upstream of the node A. In a bidirectional transmission communications network, if service transmission communication paths in two directions are not the same, but independent of each other, protection switching of a service in each direction is independent, and the embodiments of the present disclosure may be used for service protection in both directions. If service transmission communication paths in two directions are the same, corresponding protection switching is coordinated. When protection switching needs to be performed, although corresponding protection switching is coordinated, the method of the embodiments of the present disclosure is still applicable because whether to perform protection switching is independently determined in both directions of service transmission. In short, regardless of whether a service is unidirectional or bidirectional, the embodiments of the present disclosure are applicable because the embodiments of the present disclosure mainly relate to communication status monitoring and protection switching decision. Whether independent protection switching or coordinated protection switching is performed on services in two directions in a specific protection switching implementation process does not affect implementation of the embodiments of the present disclosure.

In the embodiments of the present disclosure, for a communication path, a communication status may refer to a status of a signal detected by a sink node on the communication path, and includes but is not limited to signal normal, signal degrade, signal fail, and the like. The signal normal refers to that a sink node on a corresponding communication path detects that a signal is normally transmitted. The signal degrade refers to that a sink node on a corresponding communication path detects that some signals are lost or some signals are distorted. For example, a quantity or proportion of the lost signals or distorted signals reaches a threshold (for example, reaches a degrade threshold). The signal fail refers to that a quantity or proportion of lost or distorted signals reaches a relatively high level (for example, the quantity or proportion reaches a fail threshold, and obviously the fail threshold is greater than the degrade threshold), or even signals are completely lost or distorted.

In the embodiments of the present disclosure, for a node, a communication status may be one or more of the following states: signal normal, signal degrade, or signal fail. For a protection segment, a communication status may refer to a status of a signal detected by a sink node of the protection segment, and may include one or more of the following states: signal normal, signal degrade, signal fail, signal degrade protected, signal fail protected, signal degrade unprotected, signal fail unprotected, signal fail weakly protected, or the like. Regardless of a node or a protection segment, communication statuses are sorted from superiority to inferiority as follows: signal normal, signal degrade, and signal fail. Certainly, if communication statuses are all signal degrade or signal fail, a communication status of being protected is superior to a communication status of being weakly protected, and the communication status of being weakly protected is superior to a communication status of being unprotected. If there are only three statuses: signal normal, signal degrade, and signal fail, signal normal is superior to signal degrade, and signal degrade is superior to signal fail. Priorities of path statuses are processed according to a corresponding protection manner. For example, in various protection manners that need automatic protection switching (APS) such as 1:1, a priority of signal fail of a working path is lower than a priority of signal fail of a protection path. Optionally, another more refined division method may be further used for communication statuses. For example, signal degrade may be divided into severe signal degrade and signal degrade, and signal fail may be divided into severe signal fail and signal fail, where the signal degrade is superior to the severe signal degrade, the severe signal degrade is superior to the signal fail, and the signal fail is superior to the severe signal fail. Different superiority and inferiority degrees of signals may be determined by setting different monitoring thresholds.

Signal normal refers to that a sink node of a protection segment detects that communication of a communication path currently selected by the protection segment is normal; signal degrade refers to that a sink node of a protection segment detects that signal degrade occurs in communication of a communication path currently selected by the protection segment (refer to explanation about signal degrade in the previous paragraph); signal fail refers to that a sink node of a protection segment detects that signal fail occurs in communication of a communication path currently selected by the protection segment (refer to explanation about signal fail in the previous paragraph); signal degrade recoverable refers to that, a sink node of a protection segment detects that signal degrade occurs in communication of a communication path currently selected by the protection segment, but a standby path corresponding to the currently selected communication path is signal normal, that is, communication of the current protection segment can recover to normal by means of protection switching; signal fail recoverable refers to that, a sink node of a protection segment detects that signal fail occurs in communication of a communication path currently selected by the protection segment, but a standby path corresponding to the currently selected communication path is signal normal, that is, communication of the current protection segment can recover to normal by means of protection switching; signal degrade unrecoverable refers to that, a sink node of a protection segment detects that signal degrade occurs in communication of a communication path currently selected by the protection segment, and signal degrade or signal fail is also detected on a standby path corresponding to the currently selected communication path, that is, communication of the current protection segment cannot recover to normal by means of protection switching; signal fail unrecoverable refers to that, a sink node of a protection segment detects that signal fail occurs in communication of a communication path currently selected by the protection segment, and signal fail is also detected on a standby path corresponding to the currently selected communication path, that is, communication of the current protection segment cannot recover to normal by means of protection switching; signal fail weakly protected refers to that, a sink node of a protection segment detects that signal fail occurs in communication of a communication path currently selected by the protection segment, and signal degrade is detected on a standby path corresponding to the currently selected communication path, that is, communication of the current protection segment can recover to only a signal degrade state by means of protection switching.

The foregoing communication statuses about a communication path and a protection segment are only examples, and the communication statuses of the embodiments of the present disclosure may include more statuses, and may further include more channel information, or even may include some information that is not directly associated with a channel, such as a switching wait time, a switching priority, and a mandatory switching command.

The method, the apparatus and the system provided in the embodiments of the present disclosure may be applied to an OTN field, may also be applied to a multi-service transfer platform (MSTP) field, and may be further applied to a microwave field and the like. An OTN involved in the embodiments of the present disclosure is an optical communications technology. For the OTN technology, the International Telecommunications Union has formulated corresponding standards, such as G.709/Y.1331 published in February 2012, and all content of the standard is combined with this application document.

Figure 2:
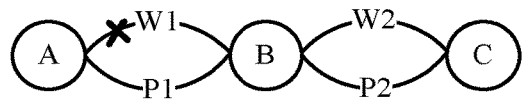
FIG. 2 is an architectural diagram of a chain network according to an embodiment of the present disclosure.

FIG. 2 provides an application scenario of an embodiment of the present disclosure. As shown in FIG. 2, if a fault (such as fiber cut) occurs in a path between a node A and a node B, the node B detects a signal loss, thereby triggering switching. Moreover, the node B cannot send a signal to a node C in a particular period of time or sends an erroneous signal to a node C in a particular period of time because of a known or an unknown reason such as clock switching or path switching. Consequently, the node C erroneously determines that a fault occurs in W2, and then performs protection switching between W2 and P2. It can be learned that, in the prior art, protection switching between nodes may be erroneous switching sometimes, and accuracy of the protection switching is relatively low. Because a time point at which protection switching between the code B and the node C is completed may be later than a time point at which protection switching between the node A and the node B is completed, an entire service reply time becomes longer, and this is not favorable to service protection. Additionally, after protection switching between the node A and the node B is completed, the node C may detect that the W2 path already recovers to normal, and may switch a service back to W2, and such repetitive service switching is not favorable to stability of a communication service.

FIG. 2 is only a schematic diagram. In fact, an actual communications network is more complex. For example, more nodes may be configured at upstream of the node A, more nodes may also be configured at downstream of the node C, and more nodes may also be configured between the node A and the node C. Two neighboring nodes may be connected to each other using one communication path, or may be connected to each other using multiple communication paths. Diversified protection manners may exist between two neighboring nodes, such as a 1+1 protection manner, a 1:1 protection manner, and a 1:N protection manner. A connection manner between multiple nodes may be chain-shaped, may be nested, may be mesh-like, or even may be ring-like. The embodiments of the present disclosure may be applied to these network architectures, and a core idea does not change.

An embodiment of the present disclosure provides a network protection method. In the method, when detecting that signal degrade or signal fail occurs in a service transmission path, a sink node of a protection segment obtains a communication status of a source node of a current protection segment, and determines, according to the communication status of the source node and a communication status of a local communication path, whether to perform protection switching, which may avoid erroneous switching to some extent, thereby improving protection switching accuracy of a communications network.

The method is applied to a communications network (such as the communications network shown in FIG. 2), the communications network includes a first protection segment (such as a protection segment between B and C), the first protection segment includes a source node (the node B), a sink node (the node C), a first communication path (W2 between B and C), and a second communication path (P2 between B and C). The source node and the sink node are connected using the first communication path and the second communication path, the first communication path is a current service transmission communication path between the source node and the sink node, and the second communication path is a standby path of the first communication path.

Figure 3:
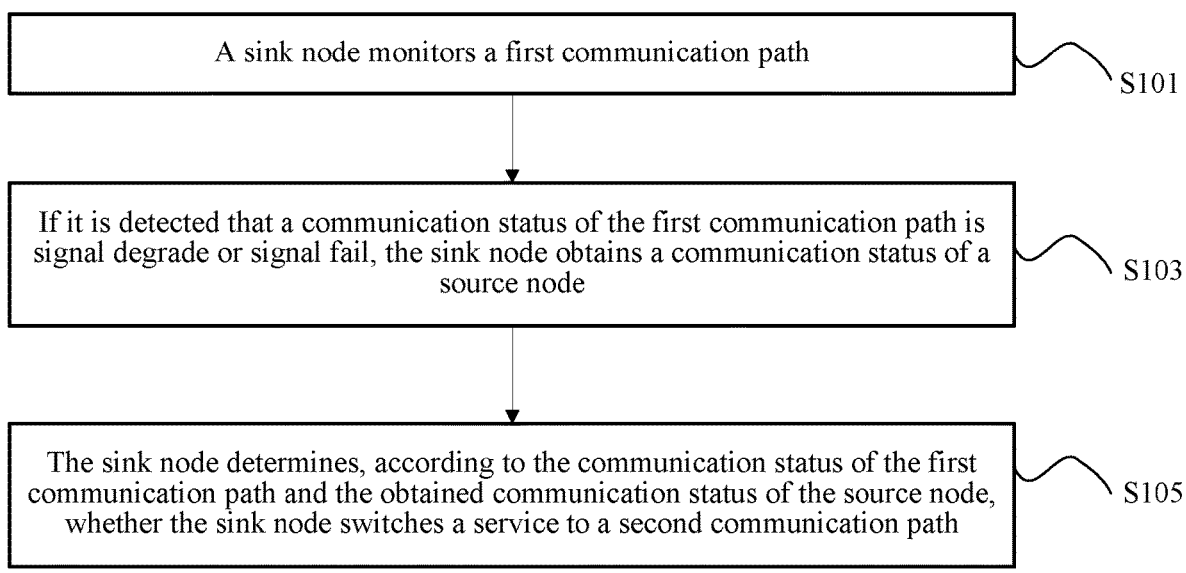
FIG. 3 is a flowchart of a method according to an embodiment of the present disclosure.
Figure 4:
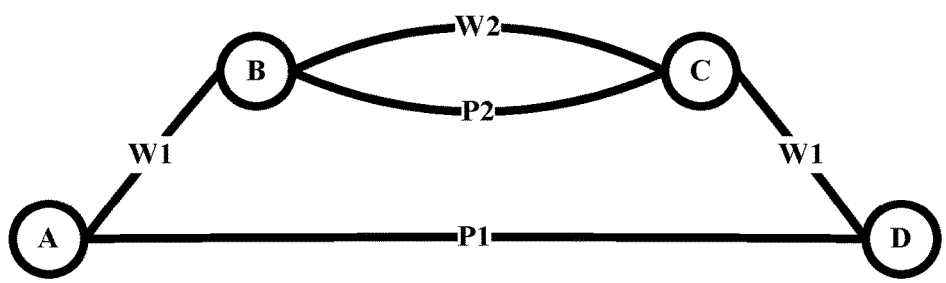
FIG. 4 is an architectural diagram of a nested network according to an embodiment of the present disclosure.

As shown in FIG. 3, the network protection method provided in this embodiment of the present disclosure includes the following several steps S101 to S105. If the network in FIG. 2 is used as an example, a sink node in the following embodiment is the node C in FIG. 2, a first communication path is W2 in FIG. 2, and a protection segment between the node A and the node B is an upstream protection segment of W2. If a network in FIG. 4 is used as an example, a protection segment between A and D is a first protection segment, the node A is a source node, a node D is a sink node, a path from A to D through B and C is a first communication path W1, and a path from A directly to D is a second communication path P1. W1 further includes a second protection segment between B and C, a current service transmission path of the second protection segment is W2, and a standby path of W2 is P2.

S101: The sink node monitors the first communication path.

A communication path may be monitored in diversified manners. For example, a communication path may be monitored in a manner of directly monitoring a communications interface, such as directly detecting whether there is communications optical port signal light, or detecting optical power of communications optical port signal light. For example, a communication path may be monitored in a manner of monitoring a bit error rate of a signal. For example, a communication path may be monitored by monitoring a particular field in a signal, such as a tandem connection monitoring (TCM) field of an OTN frame, or a path monitoring (PM) field of an OTN, or monitoring information filled in another field. Multiple other methods for monitoring a communication path also exist in the prior art, and these manners may also be applied to the embodiments of the present disclosure.

S103: If it is detected that a communication status of the first communication path is signal degrade or signal fail, the sink node obtains a communication status of the source node.

The communication status of the source node may be used to indicate a status of a signal that is received by the source node and that needs to be sent to the sink node, or may be used to indicate a status of a signal sent by the source node to the sink node, or may be used to indicate a communication status of a neighboring upstream service transmission path of the source node detected by the source node.

If a communications interface cannot receive a signal from the first communication path, for example, a corresponding optical receiver cannot receive an optical signal from the first communication path, the sink node determines that the communication status of the first communication path is a signal fail state. For example, if the sink node finds that a bit error rate of a monitored signal is greater than a set fail threshold, the sink node may also determine that the communication status of the first communication path is a signal fail state. For another example, if a signal monitored by the sink node cannot pass a verification, the sink node may also determine that the communication status of the first communication path is a signal fail state. For another example, in an OTN network, if the sink node can receive an optical signal but cannot implement framing, the sink node may also determine that the communication status of the first communication path is a signal fail state. For another example, if an error quantity or error rate of a TCM field or PM field in an OTN frame exceeds a fail threshold, the sink node may also determine that the communication status of the first communication path is a signal fail state.

If the sink node can receive some correct signals, but cannot receive all correct signals, the sink node determines that the communication status of the first communication path is a signal degrade state. For example, if a corresponding optical power detector detects that optical power input by an optical port corresponding to the first communication path is greater than 0 but less than a set threshold, the network may determine that the communication status of the first communication path is a signal degrade state. For example, the sink node detects that a bit error rate of a sent signal is greater than a set degrade threshold but less than the foregoing fail threshold; for another example, the sink node detects that some signals cannot pass a verification; for another example, in the OTN network, the sink node finds, using one or more monitoring fields, that an error rate or error quantity of the one or more monitoring fields (such as a TCM field or PM field) is greater than a value. In all these situations, the sink node may determine that the communication status of the first communication path is a signal fail state.

Generally, signal degrade and signal fail are triggering conditions of protection switching, and may trigger the sink node to switch a service signal to a standby path of the first communication path, thereby providing protection for the service signal.

However, in this embodiment of the present disclosure, the sink node needs to obtain a communication status of the source node of the first protection segment at which the sink node is located, so as to determine whether to perform protection switching, instead of directly triggering protection switching using signal degrade or signal fail signal.

Optionally, the sink node may first start a timer, and obtain a communication status of the source node of the first protection segment after a time limit set by the timer is exceeded. Because a speed at which a communication status is transmitted has a transmission time delay, a method of obtaining a corresponding communication status after waiting for a time limit may prevent the sink node from using a communication status, which is sent by an upstream node before the fault, as a basis of determining protection switching. This may further improve protection switching accuracy. Optionally, the time limit that is set by the timer is greater than a transmission time delay of the first communication path and a transmission time delay of a second communication path, that is, the standby path of the first communication path, or the time limit that is set by the timer is greater than a difference between a transmission time delay of the first communication path and a transmission time delay of the second communication path.

Correspondingly, the sink node may always obtain the communication status of the source node, that is, obtain the communication status of the source node even if the first communication path is in signal normal. Optionally, the sink node may obtain the communication status of the source node when the sink node detects that the status of the first communication path is signal degrade or signal fail.

The sink node may obtain a communication status of the source node using the first communication path, using the second communication path, or using both the first communication path and the second communication path, and then select one of the communication statuses as a basis of determining protection switching, for example, select a more inferior one of the communication status of the source node obtained in the first communication path and the communication status obtained in the second communication path as a basis of determining protection switching.

When a fault occurs in an upstream communications network of the first communication path, a corresponding fault node or fault path is in an unstable status, and such unstable status causes signal degrade or signal fail of the first communication path. Such signal degrade or signal fail is not caused by the first communication path, and such signal degrade or signal fail is not always unchanged. In this unstable process, communication statuses of one or more upstream protection segments may be transferred to a corresponding sink node. Certainly, optionally, if the corresponding sink node does not successfully obtain the communication status of the one or more upstream protection segments within a time limit, and the communication status of the second communication path is superior to the communication status of the first communication path, the sink node may perform protection switching, to switch a service transmitted on the first communication path to the corresponding second communication path.

The communication statuses may be independently transmitted, for example, transmitted using an independent wavelength, transmitted in a manner of performing low-depth amplitude modulation on a service signal, or transmitted using an independent protocol, and may be further transmitted using a particular overhead field or predetermined field of the service signal. The sink node may obtain these communication statuses in a corresponding manner.

Optionally, whether a corresponding communication status is correct may be further verified using verification information negotiated in advance, or verification information transmitted together with a communication status may be obtained, and then the communication status is verified using the obtained verification information. Optionally, verification information may be negotiated in advance, and is not related to a communication status, or may be verification information related to a communication status. Optionally, if a successfully verified communication status cannot be obtained in a predetermined time, protection switching may be performed.

S105: The sink node determines, according to the communication status of the first communication path and the obtained communication status of the source node, whether the sink node switches a service to the second communication path.

If the communication status of the first communication path is not inferior to the communication status of the source node, skipping, by the sink node, performing switching. That the communication status of the first communication path is not inferior to the communication status of the source node refers to that the communication status of the first communication path is signal degrade, and the communication status of the source node is signal degrade or signal fail; or that the communication status of the first communication path is not inferior to the communication status of the source node refers to that both the communication status of the first communication path and the communication status of the source node are signal fail.

That the communication status of the first communication path is not inferior to the communication status of the source node indicates that a signal is already in signal degrade or signal fail when the signal is transferred to the source node of the current protection segment of the first communication path. Therefore, it may be initially determined that a fault occurs in an upstream of the first communication path while no fault occurs in the first communication path. Therefore, switching does not need to be performed, and it is only necessary to wait for an upstream protection segment to perform switching. Optionally, if the communication status of the first communication path is inferior to the communication status of the source node, the sink node switches the service to the second communication path. Optionally, whether to perform protection switching may be further determined by considering the communication status of the second communication path, and if the communication status of the second communication path is not superior to the communication status of the first communication path, protection switching is not performed.

Optionally, the first communication path includes one or more protection nodes, where the protection node is configured to provide standby protection for a partial path of the first communication path; the method further includes obtaining, by the sink node, communication statuses indicated by the one or more protection nodes; and the determining, by the sink node according to the communication status of the first communication path and the obtained communication status of the source node, whether the sink node switches a service to the second communication path includes, if the communication status of the first communication path is inferior to the communication status of the source node, and a communication status indicated by at least one of the one or more protection nodes is signal protected, skipping, by the sink node, performing switching, where the signal protected refers to that, a communication status of a standby path corresponding to a protection node is superior to a communication status of a current service transmission path corresponding to a same protection node. For example, the communication status of the standby path is signal normal or signal degrade, and the communication status of the current service transmission path is signal fail. For another example, the communication status of the standby path is signal normal, and the communication status of the current service transmission path is signal degrade. In this embodiment, if the communication status of the source node is normal, and a protection segment in the first communication path indicates signal protected, that is, the current service transmission path in the protection segment is signal degrade or signal fail, but a standby path of the service transmission path is relatively superior, protection switching may be performed to implement service recovery, and the current protection segment does not need to perform switching. Optionally, whether to perform protection switching may be further determined by considering the communication status of the second communication path, that is, if the communication status of the standby path of the first communication path is not superior to the communication status of the first communication path, protection switching is not performed.

Optionally, the determining, by the sink node according to the communication status of the first communication path and the obtained communication status of the source node, whether the sink node switches a service to the second communication path includes, if the communication status of the first communication path is inferior to the communication status of the source node, a communication status indicated by at least one of the one or more protection nodes is signal protected, and a communication status indicated by a source node of a protection segment at which the at least one protection node is located is superior to the communication status of the at least one protection node, skipping, by the sink node, performing switching, where the signal protected refers to that, a communication status of a standby path corresponding to a protection node is superior to a communication status of a current service transmission path corresponding to the same protection node. In this implementation manner, it can be ensured that a communication status indicated by at least one protection node is accurate, that is, protection switching accuracy is further improved. If a communication status indicated by a source node of a protection segment at which the at least one protection node is located is not superior to the communication status of the at least one protection node, the sink node performs switching. In this manner, the sink node may quickly determine that information that the communication status indicated by the at least one protection node is signal protected may have an error, and protection switching may be accelerated if switching is immediately performed.

For example, in the network architecture of FIG. 4, if the node D detects that W1 is in signal fail or signal degrade, the communication status of the node A is signal normal, and the communication status transmitted from the node C is signal protected, such as signal degrade protected or signal fail protected, the node D does not perform protection switching.

Optionally, if the communication status of the first communication path is inferior to the communication status of the source node, and all communication statuses indicated by the one or more protection nodes are signal unprotected, the sink node switches the service to the second communication path, where the signal unprotected refers to that, a communication status of a standby path corresponding to a protection node is not superior to a communication status of a current service transmission path corresponding to the same protection node. In this case, a service on the first communication path cannot be recovered by means of protection switching of a protection node on the first communication path, and the sink node needs to perform protection switching.

For example, in the network architecture of FIG. 4, if the node D detects signal fail or signal degrade from the node C, the communication status of the node A is signal normal, and the communication status transmitted from the node C is signal unprotected, such as signal degrade unprotected or signal fail unprotected, the node D switches a service from the path W1 to the standby path P1.

Optionally, if the communication statuses indicated by the one or more protection nodes indicates that a channel may recover to a first status, and the first status is inferior to the communication status of the second communication path, the sink node performs protection switching. In this manner, even if a protection segment in the first communication path can perform service recovery, a communication status of the first communication path after the recovery is still inferior to the communication status of the second communication path, and therefore the sink node preferably directly switches a service to the corresponding standby path. This manner further improves an entire protection switching time while ensuring protection switching accuracy. This manner is particularly applicable to a nested network in which overlapping communication paths exist between different protection segments.

For example, in the network architecture of FIG. 4, if the node D detects signal fail or signal degrade from the node C, the communication status of the node A is signal normal, and the communication status transmitted from the node C is signal weakly protected, for example, the node C monitors signal fail in W2 and signal degrade in P2, a second protection segment between B and C can at most recover to signal degrade. Meanwhile, if the communication status of the second communication path P1 is superior to the first status, and is, for example, signal normal, service switching may be performed.

With reference to the foregoing implementation manner, the one or more protection nodes may be source nodes of a protection segment, or may be sink nodes of a protection segment. A communication status of a source node of a protection segment is used to indicate a communication status of a signal sent by the source node to a sink node, and may include, for example, signal normal, signal degrade, signal fail and the like. For example, if the source node is in signal normal, the signal normal is transferred, and if a service that is transferred by a previous node and that is received by the source node is in signal degrade or signal fail, or the source node cannot normally generate a signal because of a fault, the source node transfers a communication status of signal degrade or signal fail to a downstream. A communication status of a sink node of a protection segment is used to indicate a communication status, which is detected by the sink node, of the protection segment at which the sink node is located and that is, and may include, for example, signal normal, signal degrade, and signal fail, or may include, for example, signal normal, signal degrade unprotected, signal degrade protected, signal fail unprotected, and signal fail protected, and optionally, may further include signal fail weakly protected.

With reference to all the foregoing implementation manners, a communication status of a node in the communications network is represented using a value of a first series of bits carried at fixed locations in a signal, where the first series of bits are four bits; and when the value of the first series of bits is 0000 (or 00, or 000, or 00000000), it represents that a communication status of a signal sent by the corresponding node to the sink node is signal normal, when the value of the first series of bits is 0001 (or 01, or 001, or 00000001), it represents that a communication status of a signal sent by the corresponding node to the sink node is signal degrade, or when the value of the first series of bits is 0010 (or 10, or 010, or 00000010), it represents that a communication status of a signal sent by the corresponding node to the sink node is signal fail. It should be noted that, values of the foregoing bits are interchangeable. For example, 0000 (or 00, or 000, or 00000000), 0001 (or 01, or 001, or 00000001), and 0010 (or 10, or 010, or 00000010) are used to represent signal normal, signal degrade, and signal fail, and a correspondence 3 between specific values and communication statuses is interchangeable. Optionally, values of 0 to 2 (decimal) or three other different values may be used to represent signal normal, signal degrade, and signal fail respectively, where each value may be replaced with any value of 0 to 20, and meanings represented by specific values are interchangeable.

With reference to all the foregoing implementation manners, a communication status of a node in the communications network is represented using a value of a second series of bits carried at fixed locations in a signal, where the second series of bits are four bits; and when the value of the second series of bits is 0000, it represents that a communication status of a signal received by the corresponding node from the source node is signal normal, when the value of the second series of bits is 0001, it represents that a communication status of a signal received by the corresponding node from the source node is signal degrade and signal unprotected, when the value of the second series of bits is 0010, it represents that a communication status of a signal received by the corresponding node from the source node is signal fail and signal unprotected, when the value of the second series of bits is 0011, it represents that a communication status of a signal received by the corresponding node from the source node is signal degrade and signal protected, or when the value of the second series of bits is 0100, it represents that a communication status of a signal received by the corresponding node from the source node is signal fail and signal protected. Optionally, values of 0 to 4 (decimal) or five other different values may be used to represent signal normal, signal degrade unprotected, signal fail unprotected, signal degrade protected, and signal fail protected respectively, where each value may be replaced with any value of 0 to 20, and meanings represented by specific values are interchangeable.

Optionally, values of 0 to 5 (decimal) or six other different values may be used to represent signal normal, signal degrade unprotected, signal fail unprotected, signal degrade protected, signal fail protected, and signal fail weakly protected respectively, where each value may be replaced with any value of 0 to 20, and meanings represented by specific values are interchangeable.

Optionally, values of 0 to 8 (decimal) or nine other different values may be used to respectively represent that the current service transmission path is in signal normal and the standby path is in signal normal, the current service transmission path is in signal normal and the standby path is in signal degrade, the current service transmission path is in signal normal and the standby path is in signal fail, the current service transmission path is in signal degrade and the standby path is in signal normal, the current service transmission path is in signal degrade and the standby path is in signal degrade, the current service transmission path is in signal degrade and the standby path is in signal fail, the current service transmission path is in signal fail and the standby path is in signal normal, the current service transmission path is in signal fail and the standby path is in signal degrade, and the current service transmission path is in signal fail and the standby path is in signal fail, where each value may be replaced with any value of 0 to 20, and meanings represented by specific values are interchangeable.

Optionally, two to four bits may be further used to separately carry corresponding values to indicate communication statuses of the current service transmission path detected by the node, and then additional two to four bits are used to carry communication statuses of the standby path detected by the node. Optionally, corresponding two to four bits may carry values of 0 to 2 (decimal) or three other different values, to represent signal normal, signal degrade, and signal fail respectively, where each value may be replaced with any value of 0 to 20, and meanings represented by specific values are interchangeable.

Optionally, a node in the communications network determines an insert value of the second series of bits according to the following table:

| Communication status of current service transmission path | Communication status of standby path | Insert value |
| --- | --- | --- |
| signal fail | signal fail | 0010 |
| signal fail | signal degrade | 0100 |
| signal fail | signal normal | 0100 |
| signal degrade | signal fail | 0001 |
| signal degrade | signal degrade | 0001 |
| signal degrade | signal normal | 0011 |
| signal normal | signal fail | 0000 |
| signal normal | signal degrade | 0000 |
| signal normal | signal normal | 0000 | where the first column in the table is used to represent a communication status of a current service transmission path detected by the node, the second column in the table is used to represent a communication status of a standby path detected by the node, and the third column in the table is used to represent an insert value corresponding to the communication status of the current service transmission path and the communication status of the standby path.

This embodiment of the present disclosure may be applied to an OTN; communication statuses of the one or more upstream protection segments are carried in overheads of an OTN multiframe; and the OTN multiframe includes multiple OTN frames, and overheads of each OTN frame include a multiframe number, where one protection segment corresponds to one multiframe number, and different protection segments correspond to different multiframe numbers.

Optionally, the multiframe number refers to last N bits of a MFAS in the OTN frame, where N is greater than 1 and less than 8; and the communication statuses of the one or more upstream protection segments are carried in the fourth row and one or more of the ninth column to the fourteenth column of the multiple OTN frames.

Optionally, the sink node obtains the verification information and verifies a communication status from the source node using the verification information, where the channel status of the source node is a channel status obtained after the verification is successful. Alternatively, the overheads of the OTN multiframe further carry verification information; and the obtaining, by the sink node, communication statuses of the one or more upstream protection segments includes verifying, by the sink node, the communication statuses of the one or more upstream protection segments according to the verification information, and obtaining a successfully verified communication status of the one or more upstream protection segments.

Optionally, the sink node monitors the second communication path, and inserts, at a predetermined location in an OTN frame corresponding to the first protection segment according to the communication status of the first communication path and a communication status of the second communication path, a corresponding value used to represent a communication status.

How to implement this embodiment of the present disclosure in the OTN network is described below with reference to the foregoing overall description and the corresponding implementation manner.

In the OTN network, a signal is transmitted using an OTN frame, and the OTN frame includes an overhead area and a payload area. The overhead area of the OTN frame includes four rows and fourteen columns. In this embodiment of the present disclosure, a corresponding communication status is transferred using an OTN overhead area. The overhead area of the OTN frame is shown in Table 1, which is included in FIG. 10.

four bytes) may be selected, and in this embodiment of the present disclosure, one byte is used. As shown in Table 2, Table 2 provides an example of a carrying manner. In Table 2, the first row represents multiframe numbers (decimally identified), and the second row is filled with communication statuses and verification information.

TABLE 2

| 0 | 1 | 2 | 3 | 4 | 5 | 6 | 7 | 8 | 9 |
|---|---|---|---|---|---|---|---|---|---|
| protection segment 0 | protection segment 1 | protection segment 2 | protection segment 3 | protection segment 4 | protection segment 5 | protection segment 6 | protection segment 7 | verify | verify |

In this embodiment of the present disclosure, a corresponding communication status may be transferred in a multiframe manner. For an OTN mega-frame structure that newly occurs in the standard, an overhead area of the OTN mega-frame structure includes four rows and 14n columns, and a mega-frame may also be considered as a multiframe in this embodiment of the present disclosure, or a multiframe may include multiple mega-frames.

Multiframe selection may be determined according to a quantity of protection segments. If a network has five protection segments, five multiframes may be used to transfer corresponding communication statuses. Each multiframe includes a multiframe number, multiframe numbers are continuously cyclically repeated, five multiframes need to use five multiframe numbers, and each multiframe number corresponds to a protection segment.

In an implementation manner, corresponding communication statuses may be transferred using 8 multiframes, 16 multiframes, 32 multiframes, 64 multiframes or 128 multiframes. Each multiframe includes a multiframe number, multiframe numbers are continuously cyclically repeated, and each protection segment corresponds to a multiframe number. A quantity of this type of multiframes is power of 2, and multiframe numbers of the multiframes may reuse the last several bits of an MFAS field in the first row and the seventh column. For example, 8 multiframes may reuse the last three bits of the MFAS, 16 multiframes reuse the last four bits of the MFAS, and the rest can be deduced by analogy. Certainly, optionally, another reserved field in the fourth row and the ninth to fourteenth columns may be selected to carry the multiframe numbers.

A communication status of each protection segment occupies multiple bits, or occupies one byte, or occupies multiple bytes. The communication status of each protection segment may be filled into corresponding bits or one or more bytes of an OTN frame corresponding to the protection segment. Optionally, a communication status of a protection segment may be further filled into a corresponding location in an OTN frame corresponding to another protection segment (such as a downstream protection segment neighboring to the protection segment).

For example, a manner of using 16 multiframes is used as an example, and other multiframe transfer manners can be deduced by analogy. A communication status of a protection segment occupies overheads of a byte in the fourth row and the eleventh column in Table 1, and a specific occupied location is optional, and may be any location in the fourth row and the ninth to fourteenth columns. A length occupied by a communication status of a protection segment is optional. For example, only multiple bits (such as two bits, three bits, four bits, five bits, six bits, seven bits or eight bits) may be selected, or multiple bytes (such as two, three, or four bytes) may be selected, and in this embodiment of the present disclosure, one byte is used.

For 16 multiframes, if each OTN frame selects one byte, there are 16 bytes in total. The 16 bytes may be all used, or may be only partially used, and a redundant part may be filled with a predetermined value. Ten bytes are used as an example. Eight bytes are used to be filled with communication statuses of corresponding protection segments, and two bytes are used to carry verification information. Optionally, a quantity of bytes used to carry communication statuses of protection segments depends on a quantity of the protection segments, and a quantity of bytes for carrying verification information may be freely selected.

For example, two bits (redundant bits in the byte may be filled with a predetermined value) may be used to transfer signal normal, signal degrade, or signal fail. For example, 00 identifies signal normal, 01 identifies signal degrade, 10 identifies signal fail, and 11 is reserved.

In an implementation manner, not only a sink node of a protection segment fills a communication status of the protection segment detected by the sink node into a corresponding location, but also a source node of the protection segment fills a communication status of a neighboring upstream protection segment or an upstream communication path detected by the source node into a corresponding location.

A communication status of a protection segment includes a communication status of a current service transmission path of the protection segment, and a communication status of one or more standby paths corresponding to the current service transmission path. The communication status of the current service transmission path, and the communication status of the standby path corresponding to the current service transmission path may be each indicated using two bits. For example, 00 identifies signal normal, 01 identifies signal degrade, 10 identifies signal fail, and 11 is reserved. Optionally, a combination of the statuses of the current service transmission path and the standby path may be further indicated using three or four bits. For example, 0000 is used to represent that both the current service transmission path and the standby path are in signal normal, 0001 is used to represent that the current service transmission path is in signal degrade and the standby path is in signal fail, and the rest can be deduced by analogy.

In an implementation manner, a source node of a protection segment inserts 0000, 0001, or 0010 into the first four bits of the protection segment. 0000, 0001, or 0010 is used to represent a communication status of a neighboring upstream communication path of the protection segment, or represent a communication status of a current service transmission path of a neighboring upstream protection segment of the protection segment. A sink node of the protection segment inserts 0000, 0001, 0010, 0011, or 0100 into the last four bits of a byte corresponding to the protection segment.

0000, 0001, 0010, 0011, or 0100 is used to represent a communication status of the protection segment. Specific meanings of values inserted by the source node and the sink node are shown in Table 3.

TABLE 3

| Value | Source node | Sink node |
| --- | --- | --- |
| 0000 | signal normal | signal normal |
| 0001 | signal degrade | signal degrade unprotected |
| 0010 | signal fail | signal fail unprotected |
| 0011 | reserved | signal degrade protected |
| 0100 | reserved | signal fail protected |
| 0101 - - - 1111 | reserved | reserved |

The source node and the sink node fill corresponding values according to a communication status of a current service transmission path and a communication status of a standby path that are detected. As shown in Table 4, in Table 4, SF represents signal fail, SD represents signal degrade, and NORMAL represents signal normal.

TABLE 4

| Communication status of current service transmission path | Communication status of standby path | Insert value |
| --- | --- | --- |
| SF | SF | 2 |
| SF | SD | 4 |
| SF | NORMAL | 4 |
| SD | SF | 1 |
| SD | SD | 1 |
| SD | NORMAL | 3 |
| NORMAL | SF | 0 |
| NORMAL | SD | 0 |
| NORMAL | NORMAL | 0 |

When finding that signal degrade or signal fail occurs in the current transmission path, the network node obtains channel information filled by a source node and a sink node of an upstream protection segment, and determines, according to these pieces of information, whether to perform protection switching. For example, if a signal has a problem before the signal enters a range of the current protection segment, that is, a problem is found at the source node of the current protection segment, and the problem is as severe as or more severe than a problem found by the sink node of the current protection segment, the current protection segment does not perform switching. Alternatively, if another protection segment upstream of the current protection segment may perform switching and recover a service, the current protection segment does not perform switching.

A is used to represent a communication status filled by a sink node of an upstream protection segment, B is used to represent a communication status filled by a source node of the upstream protection segment, C is used to represent a communication status filled by the source node of the current protection segment, and D is used to represent a communication status detected by the sink node of the current protection segment. According to Table 3 and Table 4, when detecting that A is equal to 3 and B is equal to 0, the current node does not perform switching; when A is equal to 4 and B is equal to 0, the current node does not perform switching; when A is equal to 4 and B is equal to 1, the current node does not perform switching; or when D is less than or equal to C, the current node does not perform switching.

Figure 5:
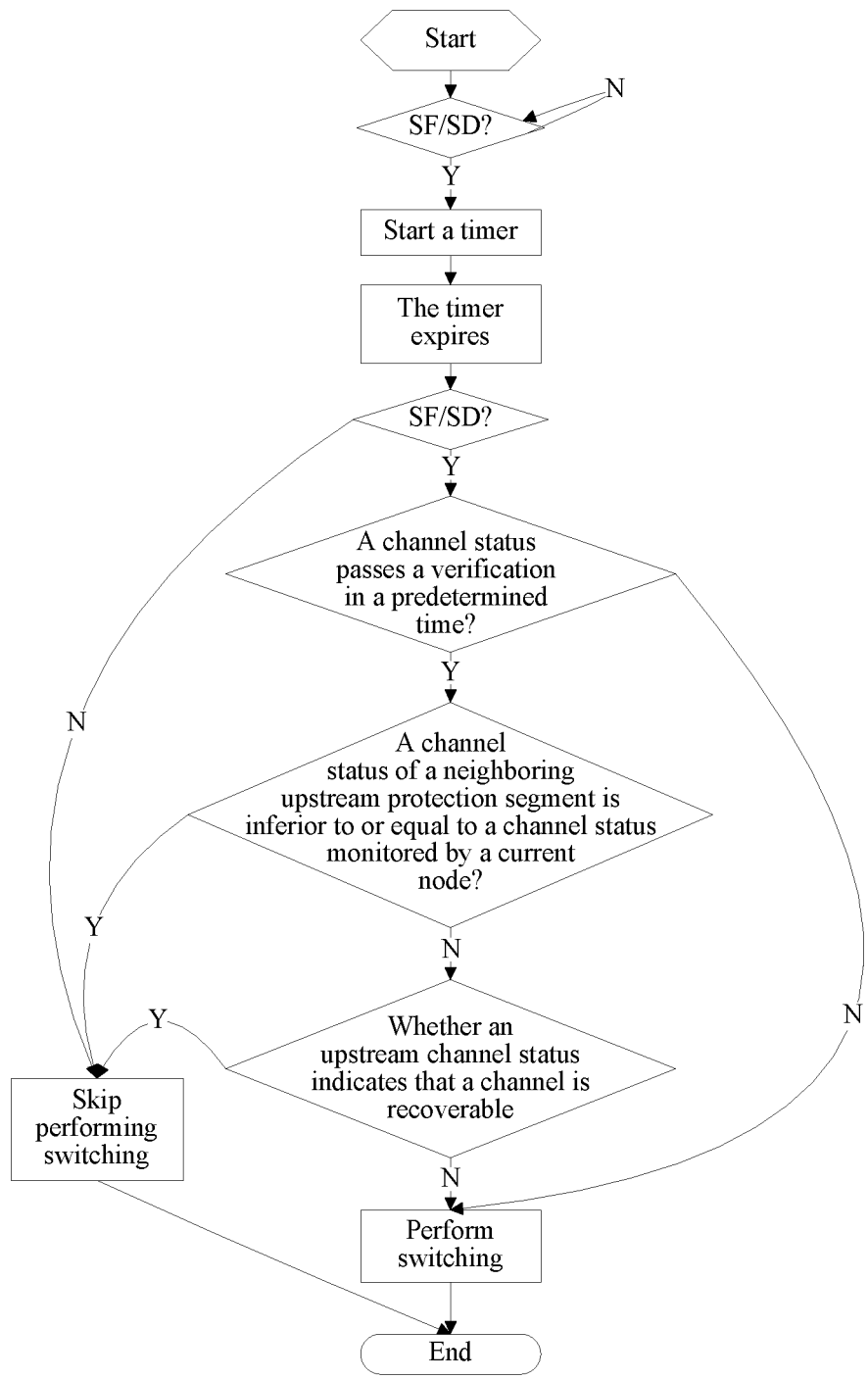
FIG. 5 is a flowchart of a method according to an embodiment of the present disclosure.

In an implementation manner, as shown in FIG. 5, a network node monitors a communication status of a current service transmission node. If an SF or SD state is detected, a timer is started. After the timer expires, it is monitored whether SF or SD can still be detected. If SF or SD can no longer be detected, switching is not performed, or if SF or SD can still be detected, communication statuses transferred from the upstream is verified. The communication statuses herein are the communication statuses filled by the source node and the sink node of the upstream protection segment. If a communication status cannot pass the verification in a predetermined time, or a corresponding communication status cannot be obtained in a predetermined time, protection switching is performed. If a communication status passes the verification in a predetermined time, whether the communication status of the neighboring upstream protection segment is as severe as or more severe than the communication status detected by the sink node of the current protection segment is checked. If yes, switching is not performed. If the status detected by the sink node of the current protection segment is more severe, it is determined whether the upstream communication status indicates that a channel is recoverable, and if yes, switching is not performed, or if not, switching is performed. Optionally, before protection switching, whether the communication status of the current service transmission path detected by the current node is inferior to the communication status of the standby path is further determined, and if yes, switching is performed, or if not, switching is not performed. It should be noted that, multiple steps in this embodiment of the present disclosure are optional, such as the step of starting a timer, the step of verifying a communication status, and the step of determining whether the upstream protection segment indicates that a channel is recoverable.

This embodiment of the present disclosure is further described below with reference to a specific scenario.

Figure 6:
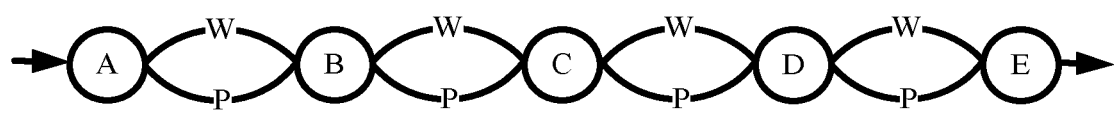
FIG. 6 is an architectural diagram of a chain network according to an embodiment of the present disclosure.

As shown in FIG. 6, four protection segments are configured between a node A and a node E, which are respectively:

protection segment 1 from A to B, where optionally, an ODUk SNC/S protection manner may be configured (or another protection manner such as ODUk SNC/I, or ODUk SNC/N may be configured), and a TCM1 field may be selected to perform channel monitoring;

protection segment 2 from B to C, where optionally, an ODUk SNC/S protection manner may be configured (or another protection manner such as ODUk SNC/I, or ODUk SNC/N may be configured), and a TCM2 field may be selected to perform channel monitoring;

protection segment 3 from C to D, where optionally, an ODUk SNC/S protection manner may be configured (or another protection manner such as ODUk SNC/I, or ODUk SNC/N may be configured), and a TCM3 field may be selected to perform channel monitoring; and protection segment 4 from D to E, where optionally, an ODUk SNC/S protection manner may be configured (or another protection manner such as ODUk SNC/I, or ODUk SNC/N may be configured), and a TCM4 field may be selected to perform channel monitoring.

In this embodiment of the present disclosure, a communication status is transferred using a method the same as the foregoing method.

At the node A, situations of bytes are shown in Table 5. Table 5 shows channel information that uses a 16-multi-frame transmission manner. Verification information of the ninth byte and the tenth byte is omitted, and remaining unoccupied bytes are not listed. The first row of Table 5 shows multiframe numbers (decimally represented), the second row shows hexadecimal value information. For specific meanings of the values in Table 5, refer to Table 3 and Table 4.

TABLE 5

| 0 | 1 | 2 | 3 | 4 | 5 | 6 | 7 |
|---|---|---|---|---|---|---|---|
| 0x00 | 0x00 | 0x00 | 0x00 | 0x00 | 0x00 | 0x00 | 0x00 |

In FIG. 6, if fiber cut occurs in a current service transmission working path W between the node A and the node B, the node B is used as a sink node of the protection segment 1, 4 is written into the last four bits on a corresponding byte in a frame whose multiframe number is 1; the node B is also used as a source node of the protection segment 2, 2 is written into the first four bits on a corresponding byte in a frame whose multiframe number is 2. All other overhead locations are not involved, and keep a default value of 0. Therefore, the values in Table 5 are changed to be values shown in Table 6.

TABLE 6

| 0 | 1 | 2 | 3 | 4 | 5 | 6 | 7 |
|---|---|---|---|---|---|---|---|
| 0x00 | 0x04 | 0x20 | 0x00 | 0x00 | 0x00 | 0x00 | 0x00 |

At the node C, C is used as a sink node of the protection segment 2, and the protection segment 2 detects SF. If the protection segment 2 obtains a communication status, which is displayed as 0x04, transferred by the frame whose multiframe number is 1. That the first four bits are 0 represents that the source node of the protection segment 1 is normal, and that the last four bits are 4 represents that the protection segment detects SF and may perform switching to recover a service, the current protection segment (the protection segment 2) detects SF, and does not need to perform switching. Additionally, if a communication status transferred by the frame whose multiframe number is 2 is displayed as 0x20. That the first four bits are 2 represents that the source node of the current protection segment has detected SF previously, the current protection segment (the protection segment 2) detects SF, and does not need to perform switching. In conclusion, the current protection segment 2 does not need to perform switching.

Moreover, the node C also needs to update a communication status backward, C is used as the sink node of the protection segment 2, and 4 (if only the service transmission path detects SF, while the standby path has not detected SF) is written into or 2 (if both the service transmission path and the standby path detect SF) is written into the last four bits of a corresponding overhead location of the frame whose multiframe number is 2. The node C is also used as a source node of the protection segment 3, 2 is inserted to the first four bits of a corresponding byte of a frame whose multiframe number is 3. All other overhead locations are not involved, and keep an original value of 0. Situations of current bytes are shown in Table 7.

TABLE 7

| 0 | 1 | 2 | 3 | 4 | 5 | 6 | 7 |
|---|---|---|---|---|---|---|---|
| 0x00 | 0x04 | 0x24 or 0x22 | 0x20 | 0x00 | 0x00 | 0x00 | 0x00 |

Operations of the node D and the node E are similar to those of the node C, a multiframe passing through the node D is changed to a value shown in Table 8, and a multiframe passing through the node E is changed to be a value shown in Table 9.

TABLE 8

| 0 | 1 | 2 | 3 | 4 | 5 | 6 | 7 |
|---|---|---|---|---|---|---|---|
| 0x00 | 0x04 | 0x24 or 0x22 | 0x24 or 0x22 | 0x20 | 0x00 | 0x00 | 0x00 |

TABLE 9

| 0 | 1 | 2 | 3 | 4 | 5 | 6 | 7 |
|---|---|---|---|---|---|---|---|
| 0x00 | 0x04 | 0x24 or 0x22 | 0x24 or 0x22 | 0x24 or 0x22 | 0x00 | 0x00 | 0x00 |

It can be learned that, when fiber cut occurs between the node A and the node B, the protection segment 1 performs switching to recover a service, and none of the protection segments 2, 3, and 4 performs switching.

Figure 7:
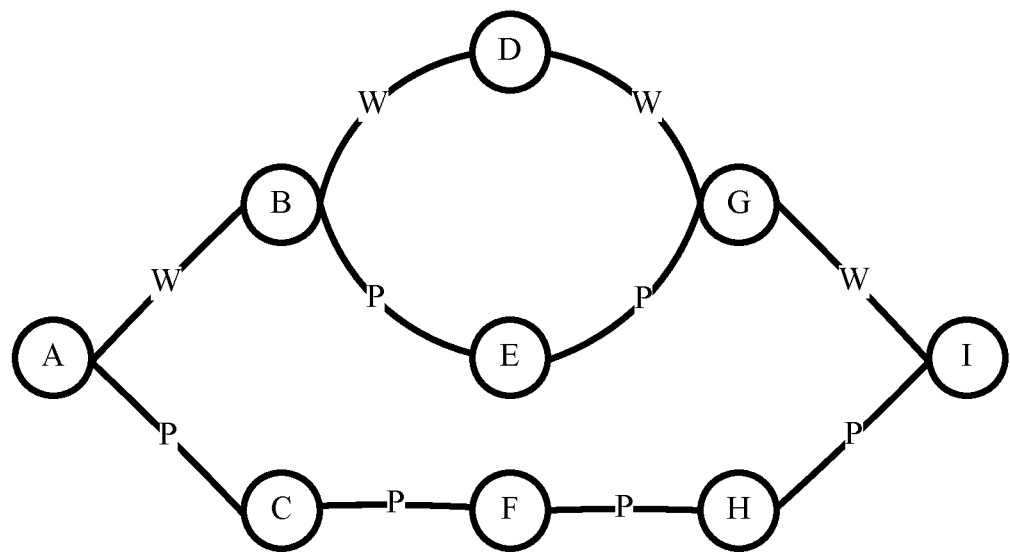
FIG. 7 is an architectural diagram of a nested network according to an embodiment of the present disclosure.

In another implementation manner, as shown in FIG. 7, two protection segments are configured between a node A and a node I, which are respectively: protection segment 1 from A to 1, where optionally, an ODUk SNC/S protection manner may be configured (or another protection manner such as ODUk SNC/I, or ODUk SNC/N may be configured), and a TCM1 field may be selected to perform channel monitoring; and protection segment 2 from B to G, where optionally, an ODUk SNC/S protection manner may be configured (or another protection manner such as ODUk SNC/I, or ODUk SNC/N may be configured), and a TCM2 field may be selected to perform channel monitoring.

Initially, at the node A, situations of bytes are shown in Table 10.

TABLE 10

| 0 | 1 | 2 | 3 | 4 | 5 | 6 | 7 |
|---|---|---|---|---|---|---|---|
| 0x00 | 0x00 | 0x00 | 0x00 | 0x00 | 0x00 | 0x00 | 0x00 |

If fiber cut occurs between the node A and the node B, the node B is used as the source node of the protection segment 2, 2 is written into the first four bits of the location 2, and all other overhead locations are not involved, and keep an original value of 0. Situations of current bytes are shown in Table 11.

TABLE 11

| 0 | 1 | 2 | 3 | 4 | 5 | 6 | 7 |
|---|---|---|---|---|---|---|---|
| 0x00 | 0x00 | 0x20 | 0x00 | 0x00 | 0x00 | 0x00 | 0x00 |

No protection segment is configured for the node D and the node E, and the node D and the node E do not obtain a communication status in multiframe overheads, do not update the communication status, and do not perform switching.

At the node G, the node G is used as the sink node of the protection segment 2, and the protection segment 2 detects SF. If 0x20 transferred from the overhead location 2 can be found using the communication status of the location 2. That the first four bits are 2 represents that the source node of the current protection segment already detects SF, the current protection segment (the protection segment 2) detects SF, and does not need to perform switching.

Moreover, the node G also needs to update a communication status of the location 2, the node G is used as the sink node of the protection segment 2, and 4 (if only the current service transmission path detects SF, while the standby path does not detect SF) is filled into or 2 (if both the current service transmission path and the standby path detect SF) is written to the last four bits of the overhead location 2. All other overhead locations are not involved, and keep an original value of 0. Situations of multiframe values obtained after updating are shown in Table 12.

TABLE 12

| 0 | 1 | 2 | 3 | 4 | 5 | 6 | 7 |
|---|---|---|---|---|---|---|---|
| 0x00 | 0x00 | 0x24 or 0x22 | 0x00 | 0x00 | 0x00 | 0x00 | 0x00 |

No protection segment is configured for the node C, the node F and the node H, and the node C, the node F and the node H do not obtain a communication status in multiframe overheads, do not update the communication status, and do not perform switching.

At the node I, I is used as the sink node of the protection segment 1, the protection segment 1 detects SF, and 0x24 or 0x22 transferred from the overhead location 2 is found using a communication status in a multiframe. That the first four bits are 2 represents that a source node of a previous protection segment has detected SF, that the last four bits are 4 represents that the protection segment detects SF and may perform switching to recover a service, and that the last four bits are 2 represents that the protection segment detects SF but cannot perform switching to recover a service. The protection segment cannot perform switching to recover a service if the source node of the protection segment already detects SF; therefore, from the perspective of information at the overhead location 2, the current protection segment (protection segment 1) detects SF, and needs to perform switching.

In the implementation manner of FIG. 7, if fiber cut does not occur between the node A and the node B, while fiber cut occurs between the node B and the node D, information carried in a multiframe received by the node I should be as shown in Table 13. I is used as the sink node of the protection segment 1, and the protection segment 1 detects SF. If 0x04 transferred from the overhead location 2 is found using a communication status transferred by a multiframe. That the first four bits are 0 represents that a source node of a previous protection segment is normal, and that the last four bits are 4 represents that the protection segment detects SF and may perform switching to recover a service, the current protection segment (the protection segment 1) detects SF, and does not need to perform switching.

TABLE 13

| 0 | 1 | 2 | 3 | 4 | 5 | 6 | 7 |
|---|---|---|---|---|---|---|---|
| 0x00 | 0x00 | 0x04 | 0x00 | 0x00 | 0x00 | 0x00 | 0x00 |

Figure 8:
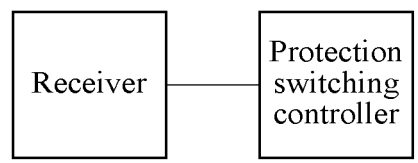
FIG. 8 is a schematic structural diagram of a network node according to an embodiment of the present disclosure.

As shown in FIG. 8, an embodiment of the present disclosure further provides a network node. The network node includes a receiver configured to receive a signal; and a protection switching controller configured to monitor, according to an input of the receiver, a communication path connected to the receiver; if a monitoring result indicates that a communication status of the communication path is a signal degrade state or a signal fail state, obtain a communication status of a source node of a protection segment at which the network node is located; and determine, according to the communication status of the communication path and the communication status of the source node, whether to switch a service to a standby path of the communication path. The communication path is a current service transmission communication path between the source node and the network node.

Optionally, the determining, according to the communication status of the communication path and the communication status of the source node, whether to switch a service to a standby path of the communication path includes, if the communication status of the communication path is not inferior to the communication status of the source node, skipping performing switching. That the communication status of the communication path is not inferior to the communication status of the source node refers to that the communication status of the communication path is signal degrade, and the communication status of the source node is signal degrade or signal fail; or that the communication status of the communication path is not inferior to the communication status of the source node refers to that both the communication status of the communication path and the communication status of the source node are signal fail.

Optionally, the determining, according to the communication status of the communication path and the communication status of the source node, whether to switch a service to a standby path of the communication path includes, if the communication status of the communication path is inferior to the communication status of the source node, switching the service to the standby path of the communication path.

Optionally, the protection switching controller is further configured to obtain communication statuses indicated by one or more protection nodes, and the one or more protection nodes are configured to provide standby protection for a partial path of the communication path; and the determining, according to the communication status of the communication path and the communication status of the source node, whether to switch a service to a standby path of the communication path includes, if the communication status of the communication path is inferior to the communication status of the source node, and a communication status indicated by at least one of the one or more protection nodes is signal protected, skipping performing switching. The signal protected refers to that, a communication status of a standby path corresponding to a protection node is superior to a communication status of a current service transmission path corresponding to the same protection node.

Optionally, the determining, according to the communication status of the communication path and the communication status of the source node, whether to switch a service to a standby path of the communication path includes, if the communication status of the communication path is inferior to the communication status of the source node, a communication status indicated by at least one of the one or more protection nodes is signal protected, and a communication status indicated by a source node of a protection segment at which the at least one protection node is located is superior to the communication status of the at least one protection node, skipping performing switching. The signal protected refers to that, a communication status of a standby path corresponding to a protection node is superior to a communication status of a current service transmission path corresponding to the same protection node. In this implementation manner, it can be ensured that a communication status indicated by at least one protection node is accurate, that is, protection switching accuracy is further improved. If a communication status indicated by a source node of a protection segment at which the at least one protection node is located is not superior to the communication status of the at least one protection node, the communications device performs switching. In this manner, the sink node may quickly determine that information that the communication status indicated by the at least one protection node is signal protected may be erroneous, and protection switching may be accelerated if switching is immediately performed.

The determining, according to the communication status of the communication path and the communication status of the source node, whether to switch a service to a standby path of the communication path includes, if the communication status of the communication path is inferior to the communication status of the source node, and all the communication statuses indicated by the one or more protection nodes are signal unprotected, switching the service to the standby path of the communication path. The signal unprotected refers to that, a communication status of a standby path corresponding to a protection node is not superior to a communication status of a current service transmission path corresponding to the same protection node.

Optionally, the network node is applied to an OTN. A communication status of a node in the OTN is carried in overheads of an OTN multiframe; and the OTN multiframe includes multiple OTN frames, and overheads of each OTN frame include a multiframe number. One protection segment corresponds to one multiframe number, and different protection segments correspond to different multiframe numbers.

Optionally, a communication status of a node in the OTN is carried in the fourth row and one or more of the ninth column to the fourteenth column of an OTN frame.

Optionally, the overheads of the OTN multiframe further carry verification information; and the protection switching controller is further configured to obtain the verification information and verify a communication status from the source node using the verification information. The channel status of the source node is a channel status obtained after the verification is successful.

Optionally, the protection switching controller is further configured to monitor the second communication path, and insert, at a predetermined location in an OTN frame including a multiframe number corresponding to the first protection segment and according to the communication status of the first communication path and a communication status of the second communication path, a corresponding value used to represent a communication status.

The receiver includes an optical-to-electrical conversion component configured to perform optical-to-electrical conversion on the received signal, and transmit an electrical signal obtained after the optical-to-electrical conversion to the protection switching controller; and the network node further includes a protection switching component configured to perform protection switching according to control of the protection switching controller.

The receiver includes an optical-to-electrical conversion component configured to perform optical-to-electrical conversion on the received signal, and transmit an electrical signal obtained after the optical-to-electrical conversion to the protection switching controller; and the network node further includes a protection switching component configured to perform protection switching according to control of the protection switching controller. Optionally, the protection switching component may be an optical switch. Optionally, the optical-to-electrical conversion component may be a photodiode. Optionally, a function of the protection switching component and a function of the protection switching controller are integrated together, and are located in a hardware component, for example, a device such as an application specific integrated circuit (ASIC), a field programmable gate array (FPGA) or a central processing unit (CPU), or a combination of two or more of devices such as an ASIC, an FPGA or a CPU.

In this embodiment of the present disclosure, the protection switching controller may be a device such as an ASIC, an FPGA or a CPU, or a combination of two or more of devices such as an ASIC, an FPGA or a CPU. The device such as the corresponding ASIC, FPGA, or CPU includes a series of executable instructions, and when these instructions are executed, the corresponding ASIC, FPGA or CPU is caused to perform a corresponding function, or perform a corresponding method. The corresponding instructions may be stored in a storage medium or solidified in the corresponding ASIC or FPGA. The protection switching controller may be further integrated with an electrical function such as analog-to-digital conversion, or serial-to-parallel conversion.

Figure 9:
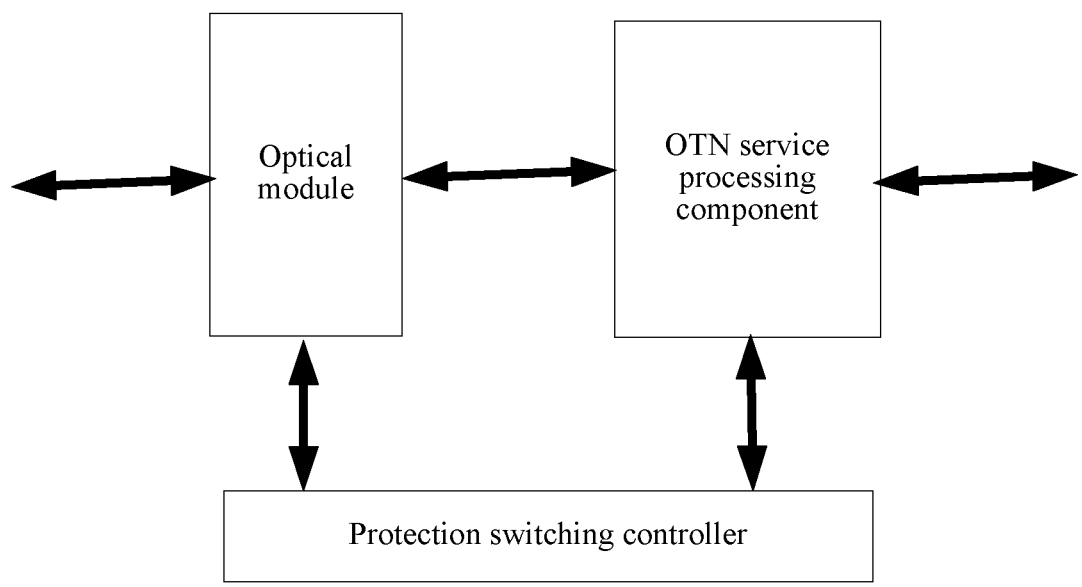
FIG. 9 is a schematic structural diagram of a network node according to an embodiment of the present disclosure.

In still another implementation manner of the present disclosure, as shown in FIG. 9, an embodiment of the present disclosure provides a network node that is applied to an OTN network. The network node includes an optical module, an OTN service processing component, and a protection switching controller.

The optical module includes multiple optical receivers that are separately configured to receive signals. The optical receiver may include a photodiode. Optionally, the optical module may further include a channel monitoring module that is configured to monitor a channel parameter of the received signal, such as an optical channel parameter and/or an electrical channel parameter, and send the monitored channel parameter to the protection switching controller. Moreover, the optical module directly sends an electrical signal obtained after optical-to-electrical conversion to the OTN service processing component. Alternatively, the optical module performs further electrical processing on the electrical signal obtained after optical-to-electrical conversion, for example, one or more types of electrical processing such as analog-to-digital conversion and serial-to-parallel conversion, and then sends a signal obtained after electrical processing to the OTN service processing component. The multiple optical receivers include at least one optical receiver corresponding to a current service transmission path, and further include at least one optical receiver corresponding to a standby path of the current service transmission path.

The OTN service processing component is configured to receive the electrical signal from the optical module, perform OTN protocol processing on the electrical signal, monitor the signal on an OTN protocol layer, and send detected information to the protection switching controller. Different from the prior art, in the present disclosure, monitored information includes overheads of the fourth row and one or more of the ninth to fourteenth columns in an OTN frame, and these overheads are used to carry and represent a communication status indicated by an upstream node of the network node.

The protection switching controller is configured to determine, according to monitored information that is input by the optical module, and/or monitored information that is input by the OTN service processing component, whether signal degrade or signal fail occurs in the current service transmission path connected to the network node. If yes, the protection switching controller determines, according to communication statuses of one or more upstream protection segments and a communication status of the current service transmission path, whether the network node performs protection switching. In this embodiment of the present disclosure, other functions of the protection switching controller are basically the same as functions in the foregoing implementation manners, and details are not described herein again.

Other aspects of the foregoing other implementation manners are also combined with this embodiment of the present disclosure, and similar content is not described herein again.

If the protection switching controller determines that protection switching needs to be performed, the protection switching controller sends a control signal to perform protection switching. There are at least two manners of protection switching. For example, the protection switching controller may send a protection switching control signal to the optical module, and control the optical module to perform switching, so as to switch the current service transmission path to the standby path. In this manner, the optical module may include a controllable optical switch, and after receiving a switching signal of the protection switching controller, the controllable optical switch performs switching, thereby receiving a signal from the standby path. In another manner, the protection switching controller sends a control signal to the OTN service processing component, and the OTN service processing component selects, from multiple electrical signals received from the optical module, signals transmitted from the standby path for selective receiving.

Optionally, the network node may include multiple optical modules, multiple OTN service processing components, and the protection switching controller, and the network node further includes at least one OTN cross component. When protection switching needs to be performed, the protection switching controller sends a control signal to the OTN cross component, and after receiving the signal, the OTN cross component selects, from signals that are input by the multiple OTN service processing components, signals transmitted from the standby path for selective receiving. Functions of the optical module and the OTN service processing component are the same as those in the foregoing implementation manners.

It should be noted that, a principle and a core of the apparatus embodiment of the embodiments of the present disclosure are consistent with the method embodiment provided in the embodiments of the present disclosure, steps or implementation details described in the method may be combined with the corresponding apparatus, and a corresponding function module is configured for the protection switching controller in the corresponding apparatus to implement the method in the method embodiment.

In the network protection method, the network node, and the communications system provided in the embodiments of the present disclosure, when signal degrade or signal fail occurs in a service transmission path, a communication status of a source node of a current protection segment is obtained, and whether to perform protection switching is determined according to the communication status of the source node and a communication status of a local communication path. This may avoid erroneous switching to some extent, thereby improving protection switching accuracy of a communications network.

In addition to the OTN field, the method of the embodiments of the present disclosure may also be applied to other fields such as MSTP and microwave, and may also be applied to other products such as a router, as long as different overheads are separately specified for various service types to transfer corresponding communication statuses. For example, in the MSTP field, there is also an implementation principle similar to that of an OTN, and as long as corresponding overheads are also added to a synchronous digital hierarchy (SDH) frame structure (such as section overheads (SOH) of STM-64), to transfer a communication status between different nodes, an effect similar to that in the OTN may also be achieved.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method applied to a communications network that comprises a source node, a sink node, a first communication path that is a current service transmission communication path between the source node and the sink node, and a second communication path that is a standby path of the first communication path, wherein the source node and the sink node are coupled to each other using the first communication path and the second communication path, wherein the first communication path comprises one or more protection nodes, wherein each of the protection nodes is configured to provide standby protection for a partial path of the first communication path, wherein at least some of the protection nodes have a protection node communication status, and wherein the method comprises:
   monitoring, by the sink node, the first communication path;
   obtaining, by the sink node, a source node communication status when a first communication path communication status is signal degrade or signal fail as indicated by the protection nodes;
   determining, by the sink node according to the first communication path communication status and the source node communication status, whether to switch a sink node service to the second communication path; and
   determining, by the sink node, that a service does not need to be switched to the second communication path when the first communication path communication status is not inferior to the source node communication status and when at least one of the protection node communication statuses is signal protected.

2. The method of claim 1, further comprising switching, by the sink node, the service to the second communication path when the first communication path communication status is inferior to the source node communication status.

3. The method of claim 1, further comprising determining, by the sink node, that the service does not need to be switched to the second communication path when the second communication path communication status is not superior to the first communication path communication status.

4. The method of claim 1, further comprising switching, by the sink node, the service to the second communication path when the first communication path communication status is inferior to the source node communication status and all communication statuses of the protection nodes are signal unprotected, wherein a standby path communication status corresponding to each of the protection nodes that are signal unprotected is inferior to a communications status transmission path status of a current service transmission path corresponding to the protection nodes.

5. The method of claim 1, wherein the source node communication status is represented using a value of four bits at fixed locations in a signal, wherein the source node communication status is signal normal when the value of four bits is 0000, is signal degrade when the value of four bits is 0001, and is signal fail when the value of four bits is 0010.

6. The method of claim 1, wherein at least one protection node communication status is represented using a value of four bits at fixed locations in a signal.

7. The method of claim 1, wherein the communications network is an optical transport network (OTN), wherein communication statuses of a plurality of nodes in the OTN are included in overheads of a plurality of OTN frames, wherein an overhead of each of the OTN frames comprises a multiframe number that corresponds to a respective protection segment, and wherein each of one or more protection segment corresponds to a different multiframe number of the multiframe numbers.

8. The method of claim 7, wherein a communication status of a node in the OTN is included in a fourth row and one or more of a ninth column to a fourteenth column of the OTN frames.

9. The method of claim 7, wherein the overhead of each of the OTN frames further comprises verification information, and wherein the method further comprises:
 obtaining, by the sink node, the verification information; and
 verifying the source node communication status using the verification information, wherein a channel status of the source node is obtained after the verification is successful.

10. The method of claim 1, wherein the first communication path communication status is not inferior to the source node communication status when the first communication path communication status is signal degrade and the source node communication status is signal degrade or signal fail.

11. The method of claim 1, wherein the first communication path communication status is not inferior to the source node communication status when the first communication path communication status and the source node communication status are signal fail.

12. A sink node, comprising:
 a receiver configured to receive a signal; and
 a protection switching controller coupled to the receiver and configured to:
  monitor, using the receiver, a communication path between the sink node and a source node, wherein the communication path is a current service transmission communication path between the source node and the sink node, and wherein the communications path comprises a standby path;
  obtain a source node communication status as indicated by one or more protection nodes configured to provide standby protection for a partial path of the communication path when a communication path communication status is a signal degrade state or a signal fail state;
  determine, according to the communication path communication status and the source node communication status, whether to switch a service to the standby path; and
 determine that the service does not need to be switched to the standby path when the communication path communication status is not inferior to the source node communication status and at least one of the protection node communication statuses is signal protected.

13. The sink node of claim 12, wherein the communication path communication status is not inferior to the source node communication status when the communication path communication status is signal degrade and the source node communication status is signal degrade or signal fail.

14. The sink node of claim 12, wherein the protection switching controller is further configured to switch the service to the standby path when the communication path communication status is inferior to the source node communication status.

15. The sink node of claim 12, wherein the protection switching controller is further configured to switch the service to the standby path when the communication path is inferior to the source node communication status and all communication statuses indicated by the protection nodes are signal unprotected, and wherein a standby path communication status of each of the protection nodes that are signal unprotected is inferior to a current service transmission path communication status corresponding to the protection nodes.

16. The sink node of claim 12, wherein obtaining, by the sink node, the source node communication status comprises receiving at least one message indicating at least one of: signal is not received, signal exceeds an error threshold, signal not received within a set time frame, signal status at a wavelength is different than signal status at a different wavelength, or signal may yield different status along multiple paths.

17. The sink node of claim 12, wherein the communication path communication status is not inferior to the source node communication status when the communication path communication status and the source node communication status are signal fail.

18. A network node comprising:
 a receiver; and
 a transmitter coupled to the receiver and configured to transmit an optical transport network (OTN) frame via a communications network, wherein the OTN frame comprises a protection segment communication status of a protection segment in the communications network, wherein the OTN frame comprises an overhead area of four rows and fourteen columns, wherein an overhead area comprises:
  a multiframe number that refers to a last N bits of a multiframe alignment signal MFAS in the OTN frame, wherein N is greater than 1 and less than 8; and
 multiple bits that indicate the protection segment communication status, wherein the multiframe number corresponds to the protection segment.

19. The network node of claim 18, wherein multiple bits are located at a fourth row of the four rows and one or more of a ninth column to a fourteenth column of the overhead area.

20. The network node of claim 18, wherein a source node communication status of a source node of the protection segment is represented using a value of four bits at fixed locations in the OTN frame, wherein the source node is signal normal when the value of four bits is 0000, and wherein and the source node communication status is signal fail when the value of four bits is 0010.

* * * * *